United States Patent
Troxel

(10) Patent No.: US 11,041,950 B2
(45) Date of Patent: Jun. 22, 2021

(54) SURVEILLANCE SYSTEMS PROVIDING INTEGRATED FUNCTIONAL REDUNDANCY

(71) Applicant: Aviation Communication & Surveillance Systems, LLC, Phoenix, AZ (US)

(72) Inventor: James Roy Troxel, Glendale, AZ (US)

(73) Assignee: AVIATION COMMUNICATION & SURVEILLANCE SYSTEMS, LLC, Phoenix, AZ (US)

(*) Notice: Subject to any disclaimer, the term of this patent is extended or adjusted under 35 U.S.C. 154(b) by 191 days.

(21) Appl. No.: 16/163,385

(22) Filed: Oct. 17, 2018

(65) Prior Publication Data

US 2019/0113617 A1    Apr. 18, 2019

Related U.S. Application Data

(60) Provisional application No. 62/573,577, filed on Oct. 17, 2017.

(51) Int. Cl.
*G01S 13/933* (2020.01)
*G08G 5/00* (2006.01)
(Continued)

(52) U.S. Cl.
CPC ............ *G01S 13/933* (2020.01); *G01S 7/032* (2013.01); *G01S 13/765* (2013.01); *G01S 13/767* (2013.01); *G06F 11/18* (2013.01); *G08G 5/0008* (2013.01); *G08G 5/0013* (2013.01); *G08G 5/0078* (2013.01); *G08G 5/045* (2013.01); *G01S 13/781* (2013.01)

(58) Field of Classification Search
CPC ..... G01S 13/933; G01S 7/032; G08G 5/0013; G08G 5/0008; G08G 5/045

USPC ......................................... 342/30, 27, 29, 32
See application file for complete search history.

(56) References Cited

U.S. PATENT DOCUMENTS 6,999,022 B1    2/2006  Vesel et al.
2005/0156777 A1    7/2005  King et al.
(Continued)

FOREIGN PATENT DOCUMENTS

| WO | 2000057204 | 9/2000 |
| WO | 2008054507 | 5/2008 |

OTHER PUBLICATIONS

Notification of Transmittal of the International Search Report and the Written Opinion of the International Searching Authority, or the Declaration issued by the European Patent Office/International Searching Authority, dated Jan. 31, 2019, on the related international application PCT/US2018/056354, international filing date Oct. 17, 2018.

*Primary Examiner* — Bo Fan
(74) *Attorney, Agent, or Firm* — Dickinson Wright PLLC

(57) ABSTRACT

Various communication systems may benefit from suitable use of redundancy. For example, surveillance systems in avionics applications may benefit from having functional redundancy. A system can include a collision avoidance or alerting system function in wired connection to a directional antenna. The system can also include a first mode-S transponder function in wired connection to the directional antenna. The system can further include a second mode-S transponder function in wired connection to the directional antenna, wherein the first mode-S transponder function is independent from the second mode-S transponder function.

11 Claims, 16 Drawing Sheets

(51) Int. Cl.
  *G06F 11/18* (2006.01)
  *G01S 13/76* (2006.01)
  *G08G 5/04* (2006.01)
  *G01S 7/03* (2006.01)
  *G01S 13/78* (2006.01)

(56) References Cited

U.S. PATENT DOCUMENTS

2006/0267829 A1* 11/2006 Brandao .............. G08G 5/0078
  342/29
2009/0201191 A1* 8/2009 Kozhevnikov ....... G01S 13/878
  342/32

* cited by examiner

SURVEILLANCE SYSTEMS PROVIDING INTEGRATED FUNCTIONAL REDUNDANCY

CROSS-REFERENCE TO RELATED APPLICATION

This application is a non-provisional, and claims the benefit and priority of, U.S. Provisional Patent Application No. 62/573,577, filed Oct. 17, 2017, the entirety of which is hereby incorporated herein by reference.

BACKGROUND

Field

Various communication systems may benefit from suitable use of redundancy. For example, surveillance systems in avionics applications may benefit from having functional redundancy.

Related Art

In the United States, in order for aircraft to fly in most controlled airspace regions, a working Mode-C or Mode-S transponder is required. In the United States, this requirement is listed in 14 CFR 91.215 "ATC Transponder and Altitude Reporting Equipment Use," the content of which is hereby incorporated by reference. Most operational aircraft contain two transponders, including those aircraft used for air transport and commuter airlines, as well as business aviation and military transport. In these aircraft, only one of the two transponders is typically active at any one time, the other remaining in standby mode, a mode in which the transponder does not receive or transmit. The primary purpose of carrying two operational transponders is to provide redundancy in the case of the loss of one of the systems, either in an airborne scenario or an on-ground scenario.

As part of the aircraft certification process, a minimum set of equipment required for operation is defined, namely the Minimum Equipment List (MEL). The MEL typically requires one operational transponder for take-off. An airplane which has a single transponder may be grounded until a maintenance operation is performed, which may present an unacceptable operational scenario. Also, loss of a transponder during flight can increase the pilot workload and require special routing procedures from Air Traffic Control (ATC). In addition, an aircraft without an operational transponder will be invisible to Traffic Alert and Collision Avoidance Systems, such as TCAS-II or ACAS-II, which can decrease the safety of the flight.

SUMMARY

According to certain embodiments of the present invention, a system can include a collision avoidance or alerting system function in wired connection to a directional antenna. The system can also include a first mode-S transponder function in wired connection to the directional antenna. The system can further include a second mode-S transponder function in wired connection to the directional antenna, wherein the first mode-S transponder function is independent from the second mode-S transponder function.

BRIEF DESCRIPTION OF THE DRAWINGS

The accompanying drawings are provided for purposes of illustration and not by way of limitation.

DETAILED DESCRIPTION

Certain embodiments of the present invention relate to an integrated TCAS-II and Mode-S transponder system, in the form of a single unit that can perform both functions. This system may advantageously reduce the size, weight, power and cost of a non-integrated TCAS and transponder unit, by sharing common hardware and software resources, such as the antennas, transmitters, receivers, power supply, processors and input/output (I/O) signals. The T³CAS system, an example of such a system provided by Aviation Communication & Surveillance Systems (ACSS), may still require an off-side Mode-S transponder to be installed in the aircraft, in order to provide the required availability for this function.

Figure 1:
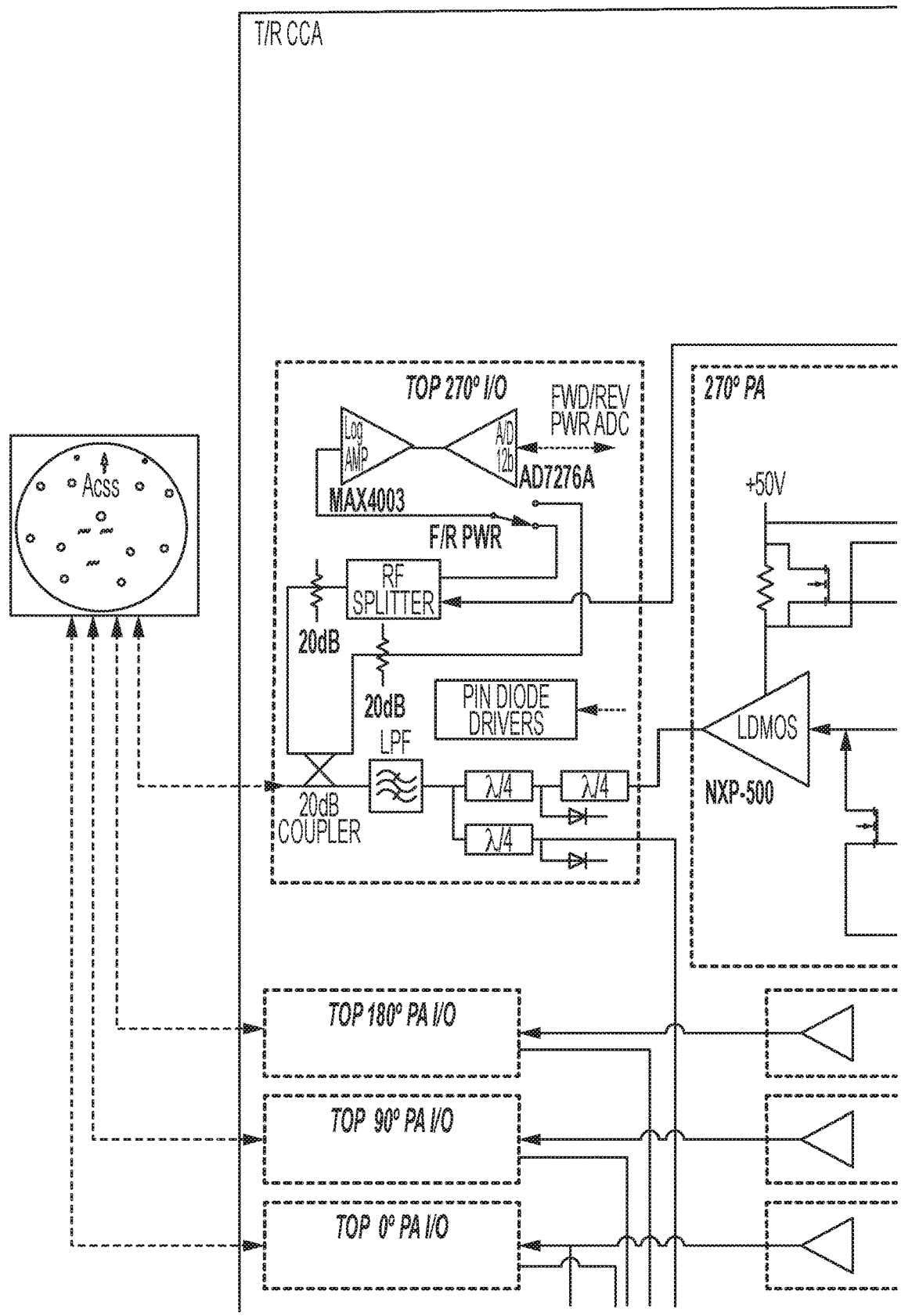
FIG. 1 illustrates an integrated TCAS/Transponder System (similar to T³CAS), which contains a single non-redundant transponder function.
Figure 1:
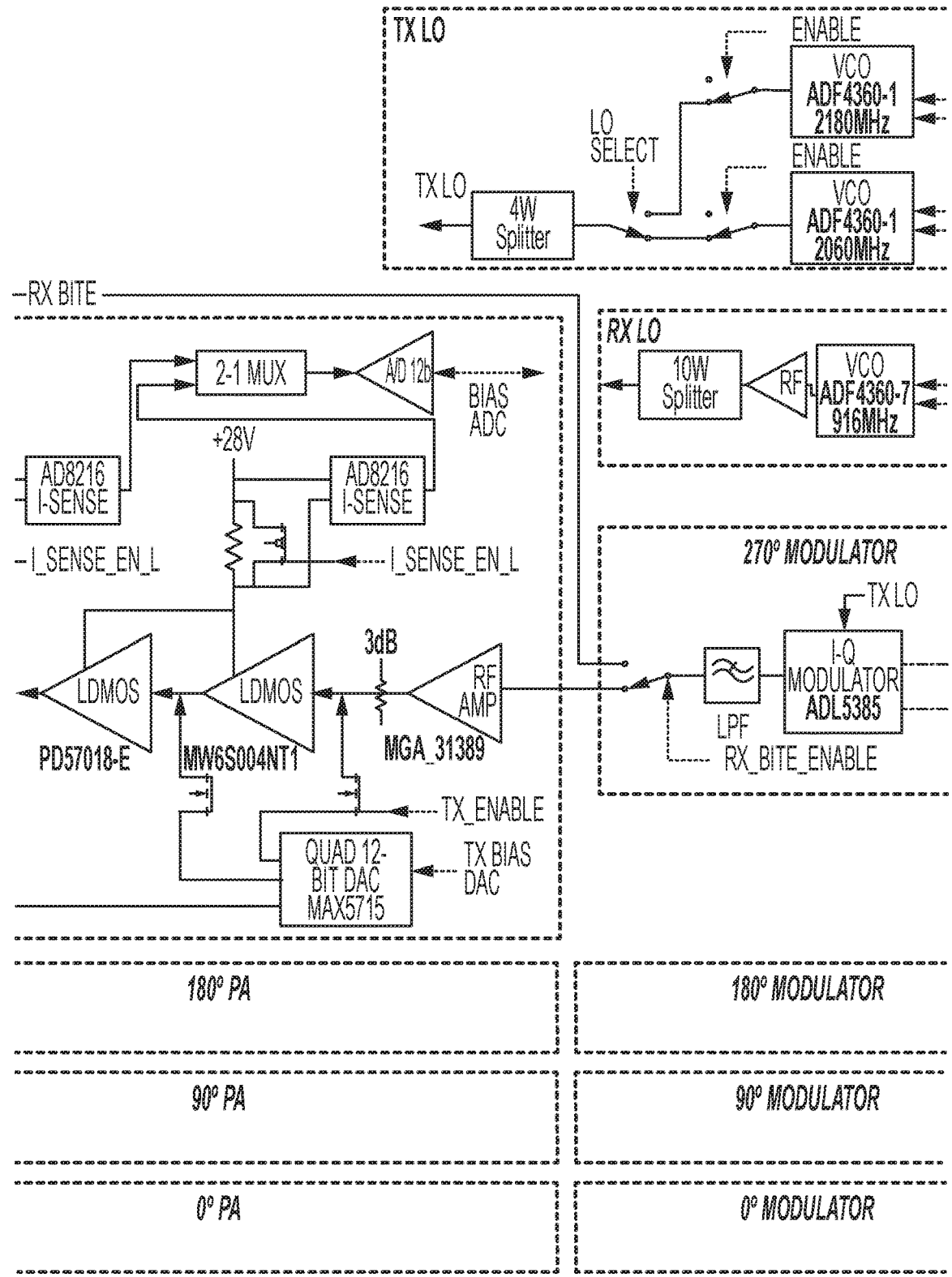
Figure 1:
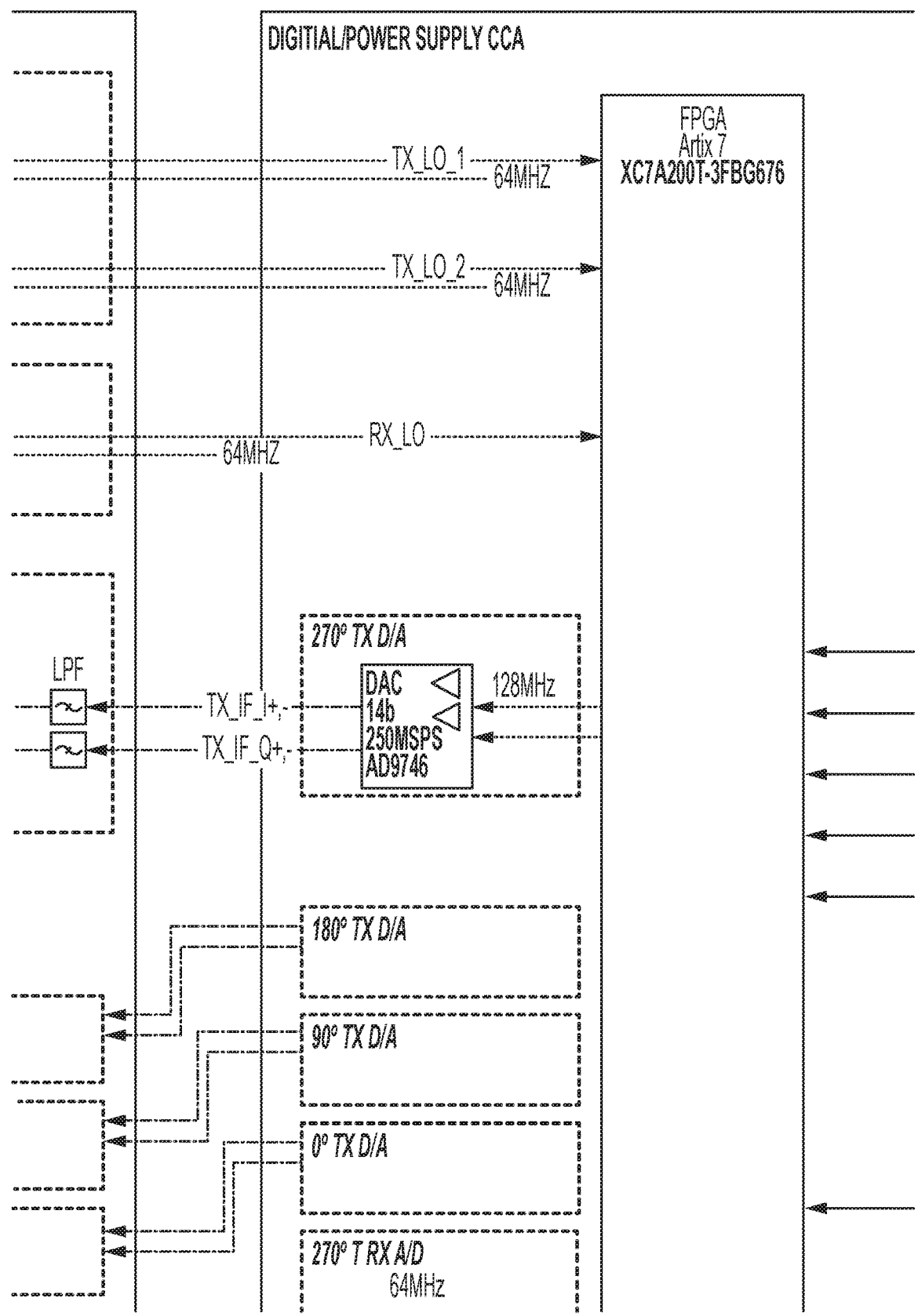
Figure 1:
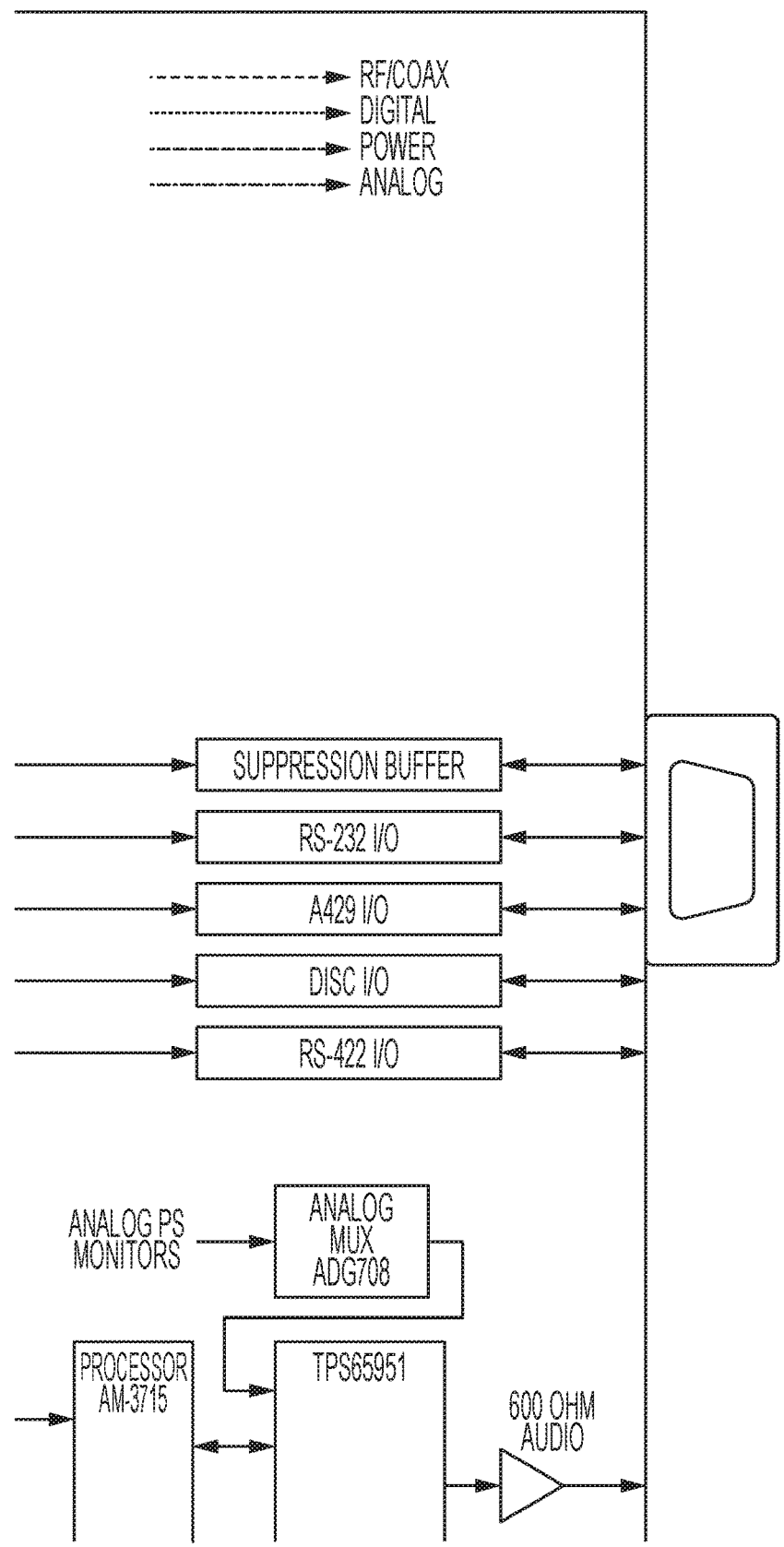
Figure 1:
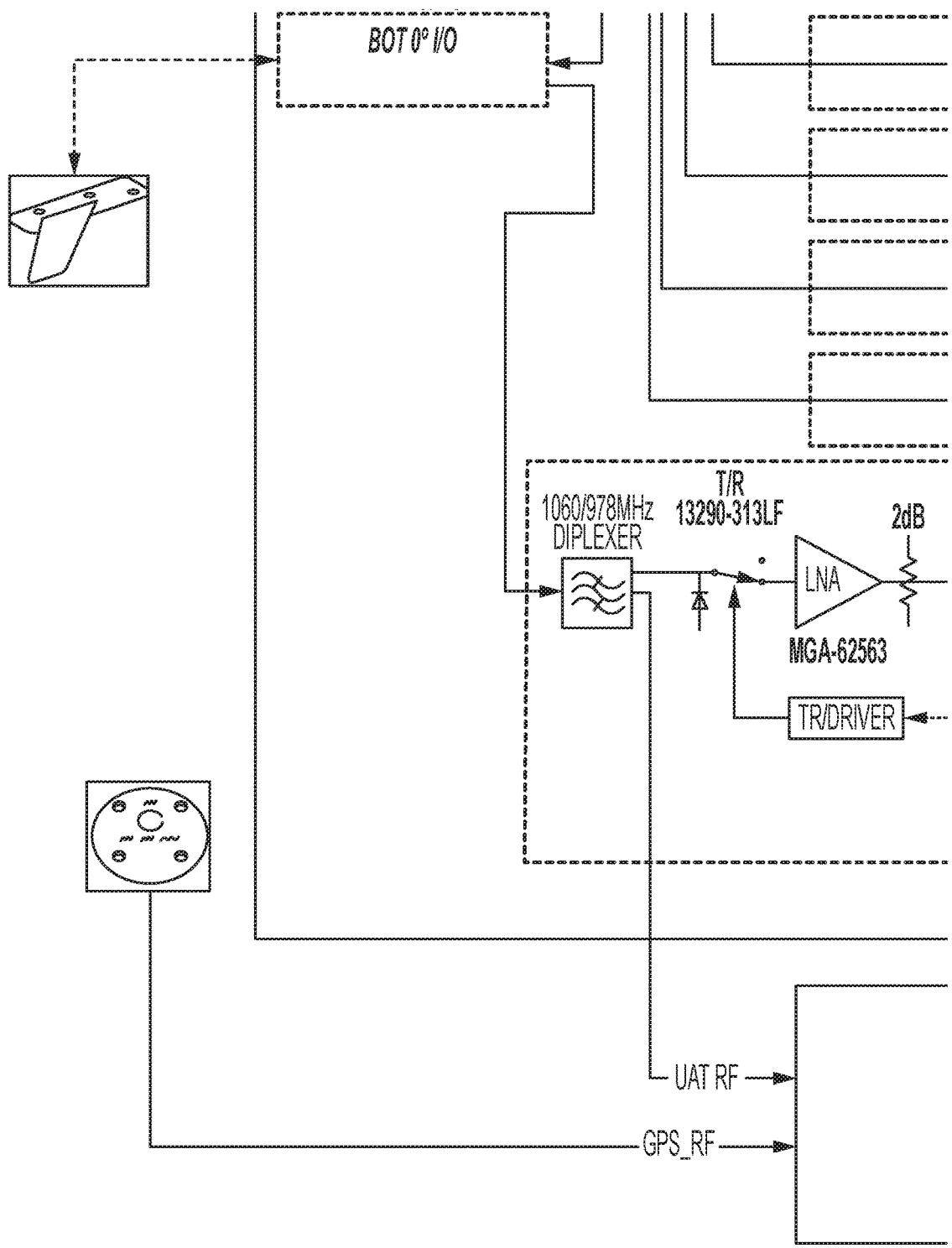
Figure 1:
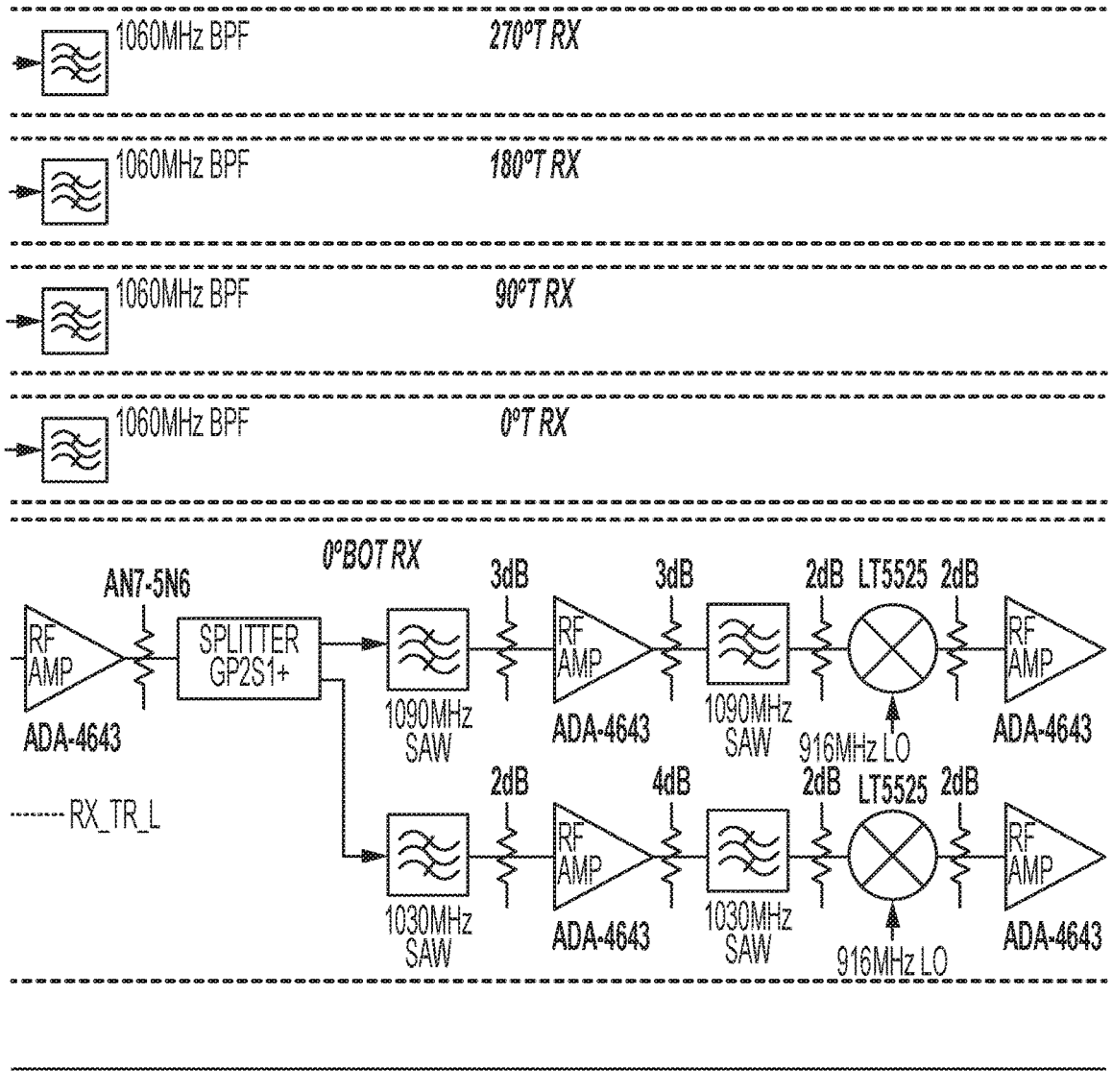
Figure 1:
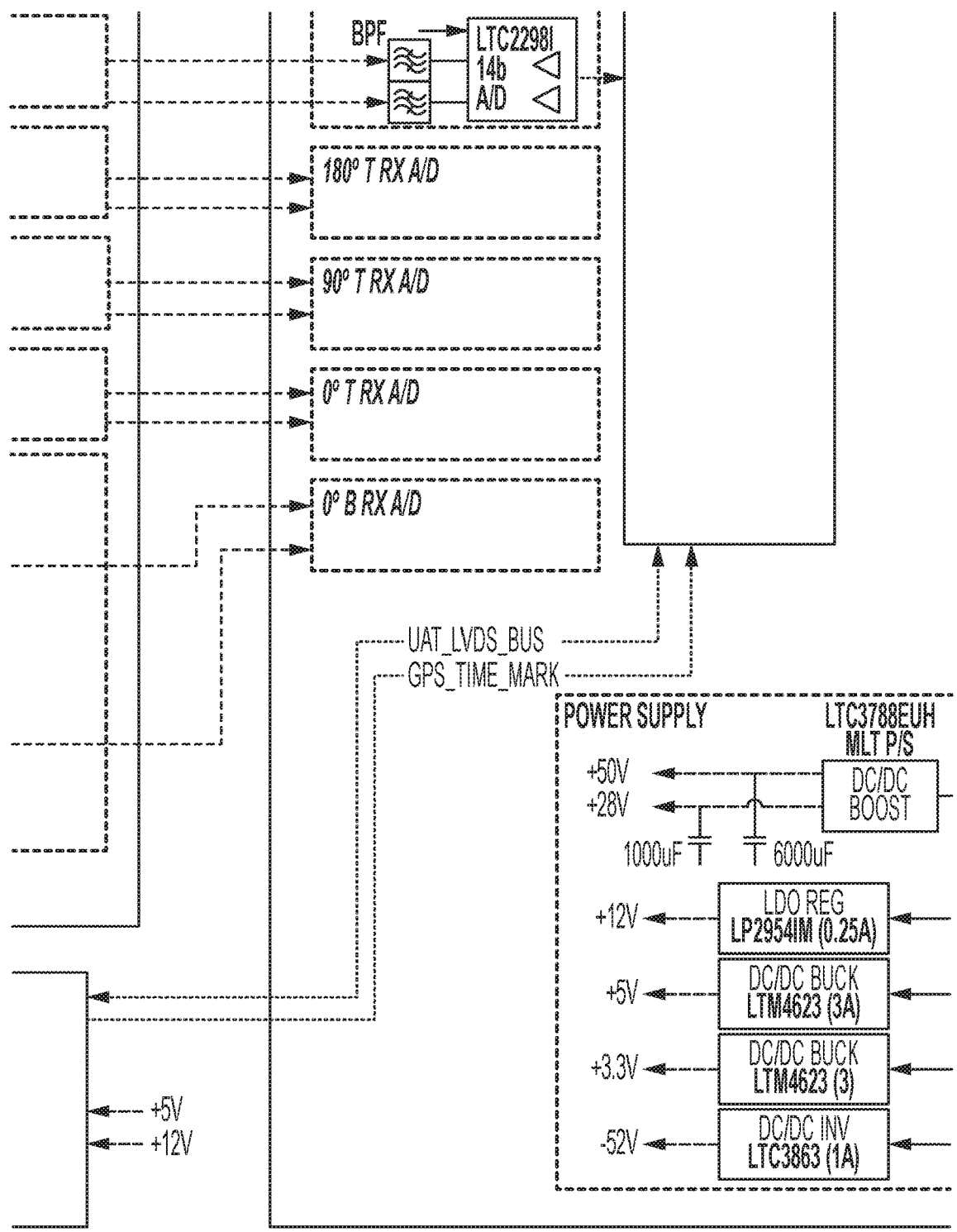
Figure 1:
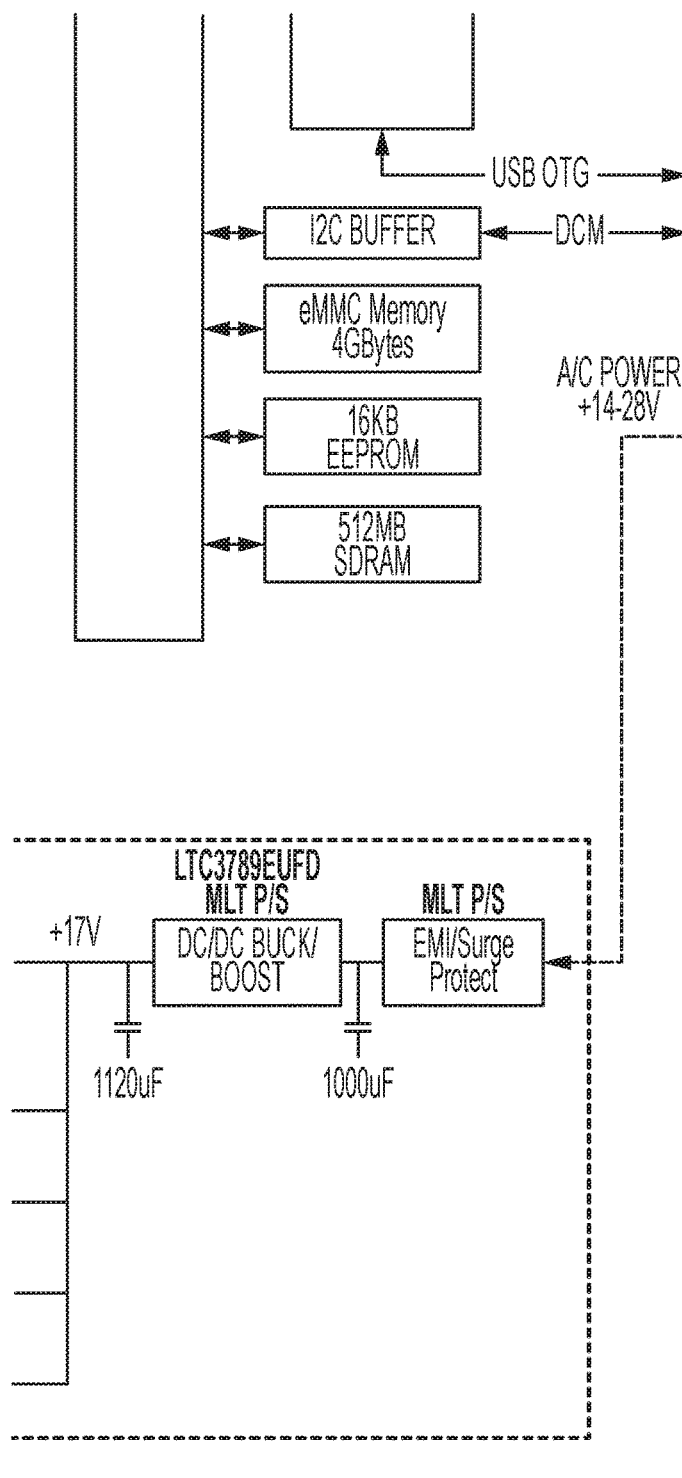

FIG. 1 illustrates an integrated TCAS/Transponder System (similar to T³CAS), which contains a single non-redundant transponder function. The TCAS-II system requires the ability to generate 1030 MHz interrogations in a directional pattern and receive 1090 MHz replies from transponders in order to determine the bearing to an intruder. This requires at least one directional antenna (some TCAS systems, such as T3CAS, can use a top and bottom mounted directional antenna). FIG. 1 shows a TCAS-II system with a top directional antenna and a bottom omni-directional antenna. For the Mode-S transponder function, the system may transmit omni-directional 1090 MHz-replies out of either a directional or an omni-directional antenna.

In order to transmit 1030 MHz directional interrogations on a 4-element antenna array for the TCAS-II function, or 1090 MHz omni-directional replies for the Mode-S transponder/automatic dependent surveillance—broadcast (ADS-B) function, the system may provide four independent power amplifiers in which the phase and amplitude of each of the amplifiers can be adjusted independently.

The system may contain four independent receivers for each of the antenna ports for receiving 1030 MHz or 1090 MHz signals. The amplitude and phase relationship of the received signals may be processed to determine the bearing for the TCAS-II receive function, or to provide the equivalent of an omni-directional antenna for the Mode-S transponder or ADS-B receive functions. If a bottom directional antenna is used, four additional receivers may be required for processing the bottom antenna signals. FIG. 1 has only a bottom omni-directional antenna, so only one additional bottom receiver may be required. The power amplifiers may be shared between the top and bottom antennas, such that the system transmits out of only one antenna at a time.

Referring to FIG. 1, a majority of the circuitry has common mode failures to both the TCAS and transponder functions. A failure in the processor, power supply, a transmitter or portions of the receiver will cause the loss of both TCAS and transponder functions.

Figure 2:
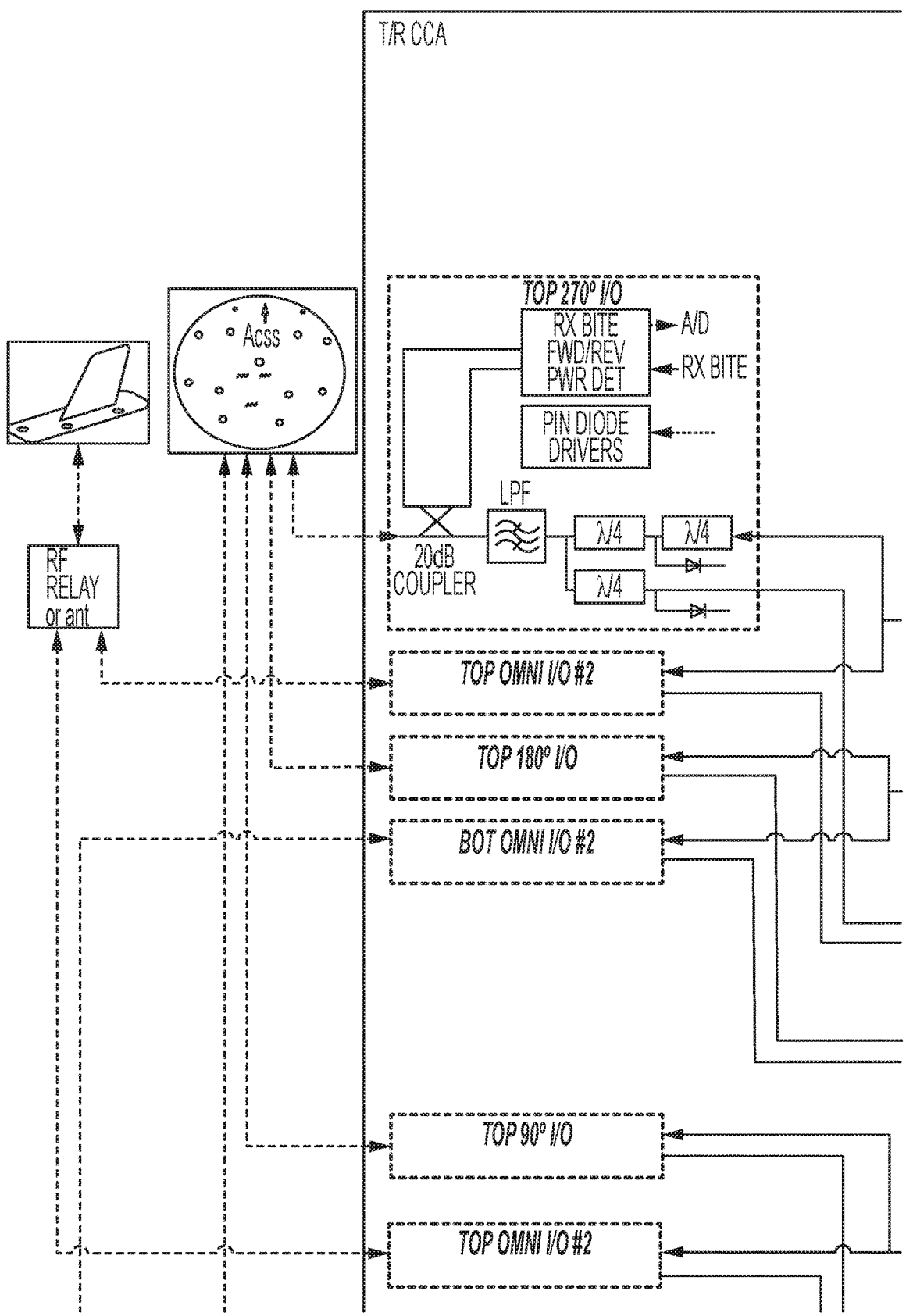
FIG. 2 illustrates integrated redundancy for the transponder function, according to certain embodiments of the present invention.
Figure 2:
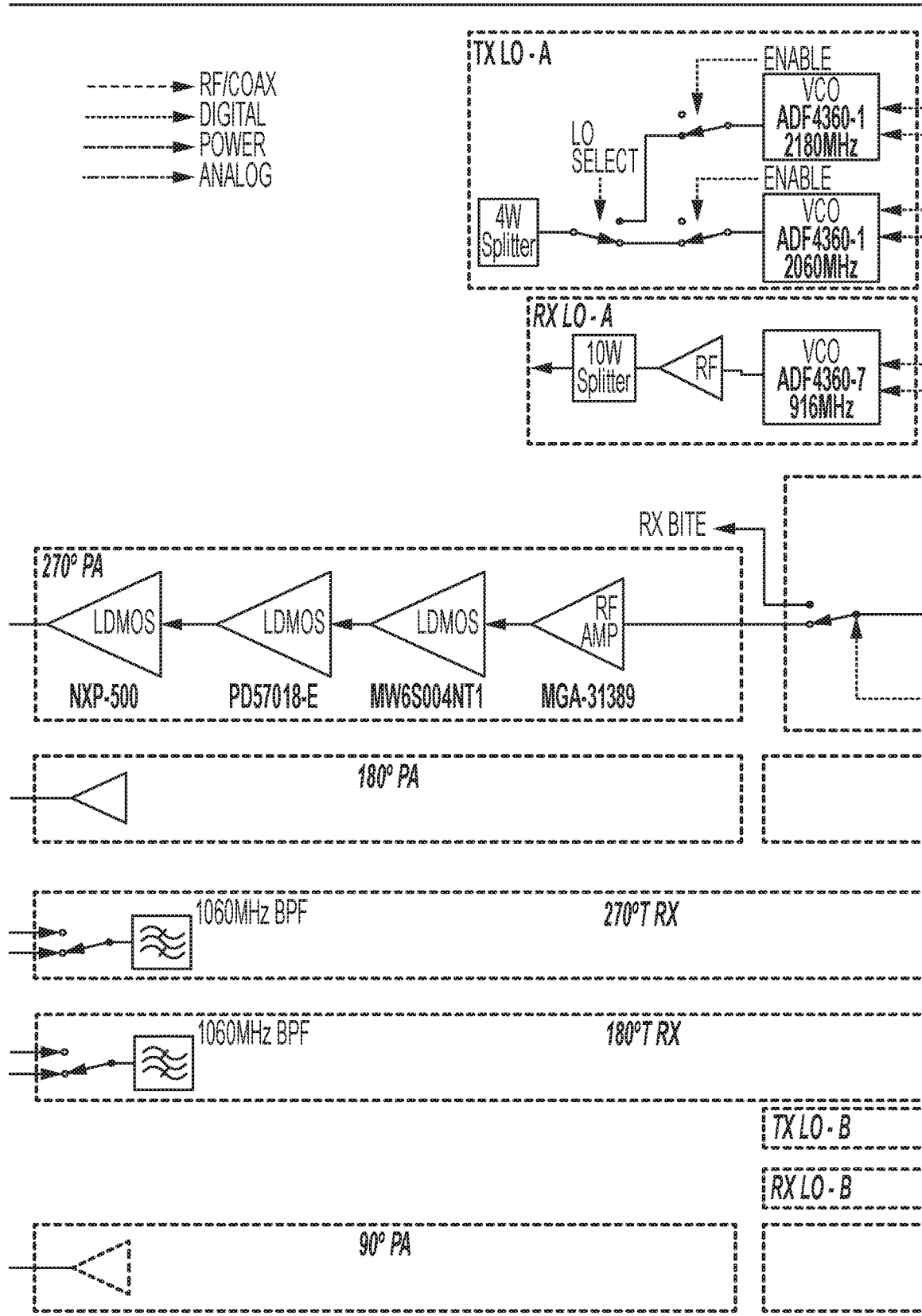
Figure 2:
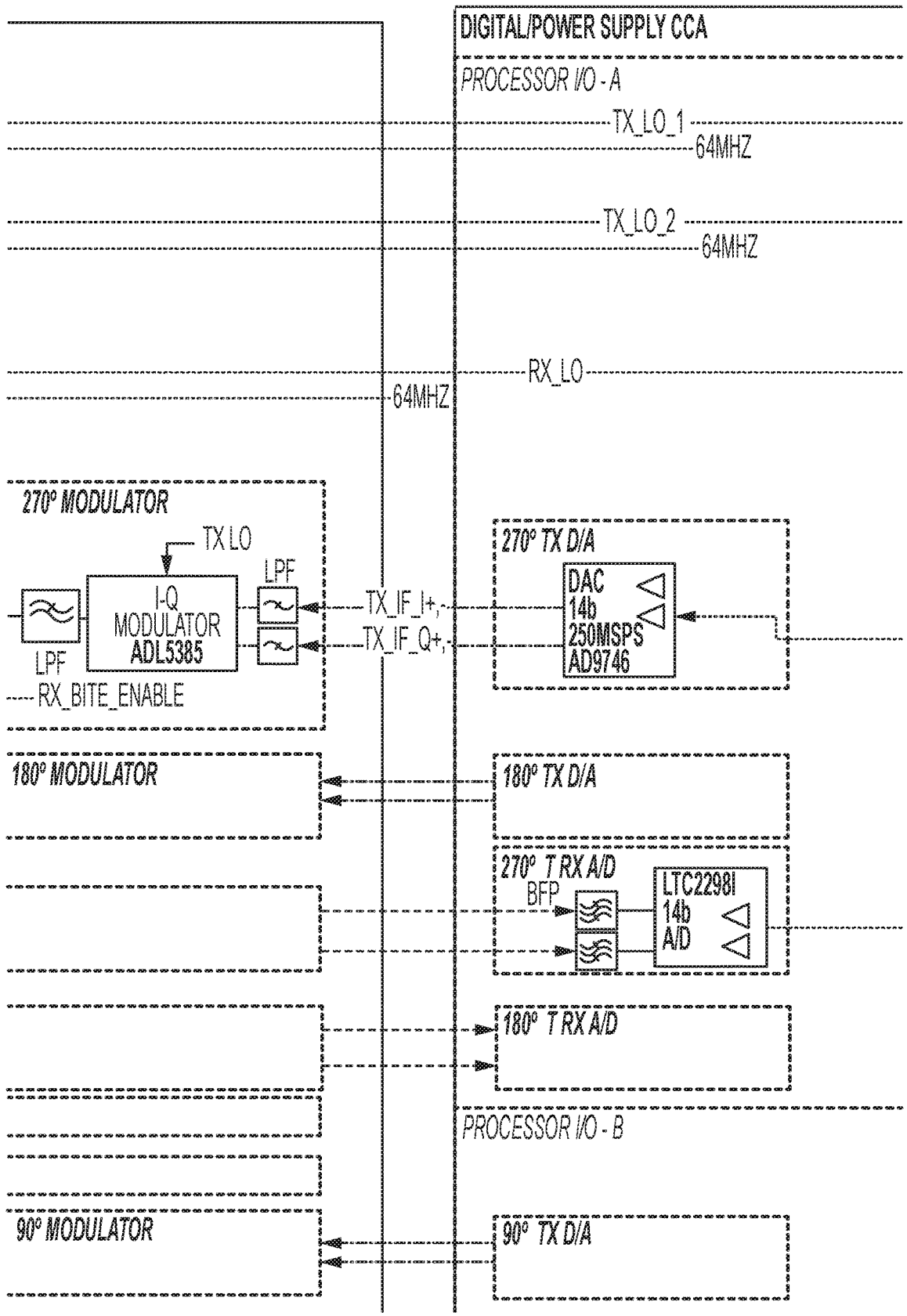
Figure 2:
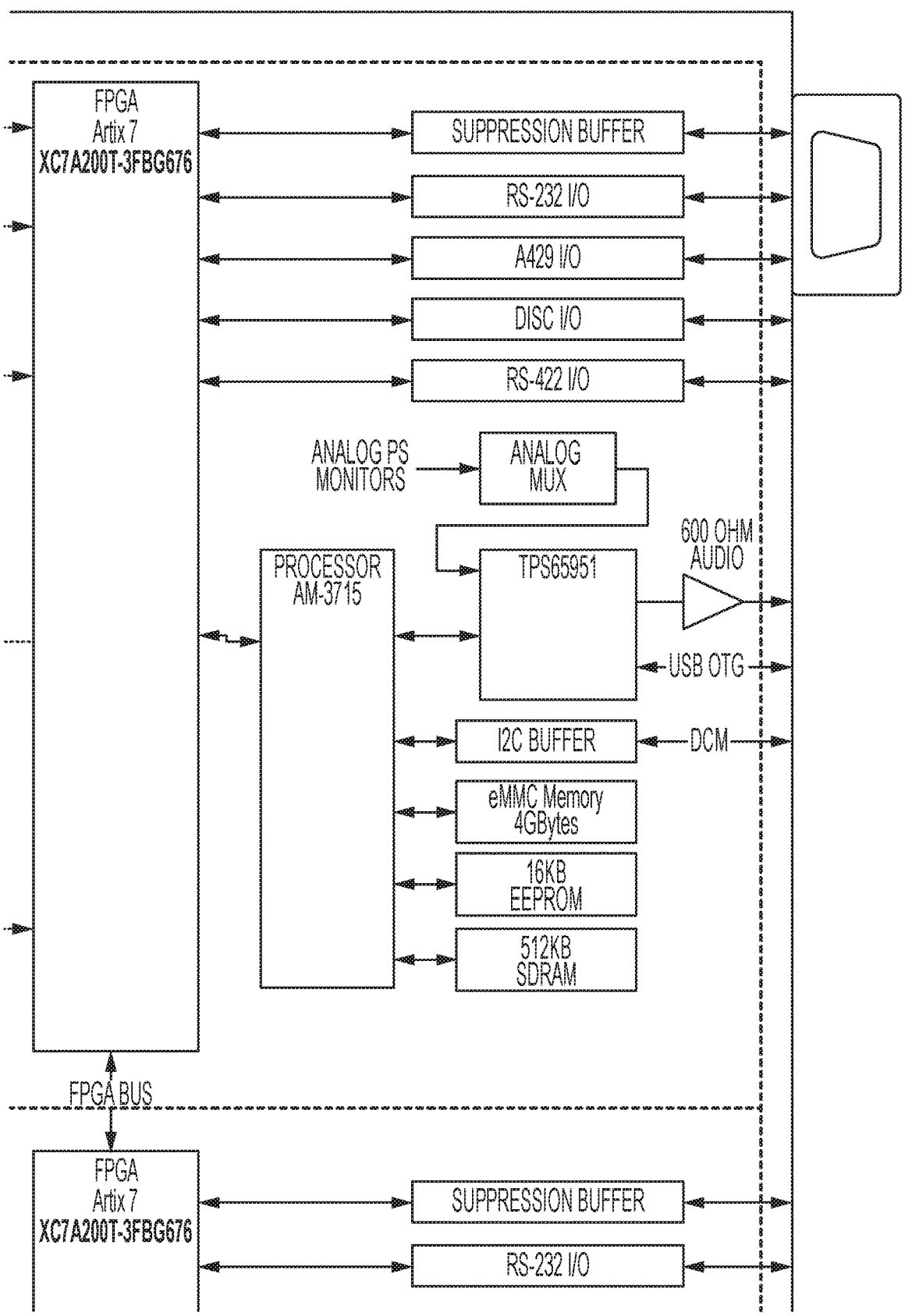
Figure 2:
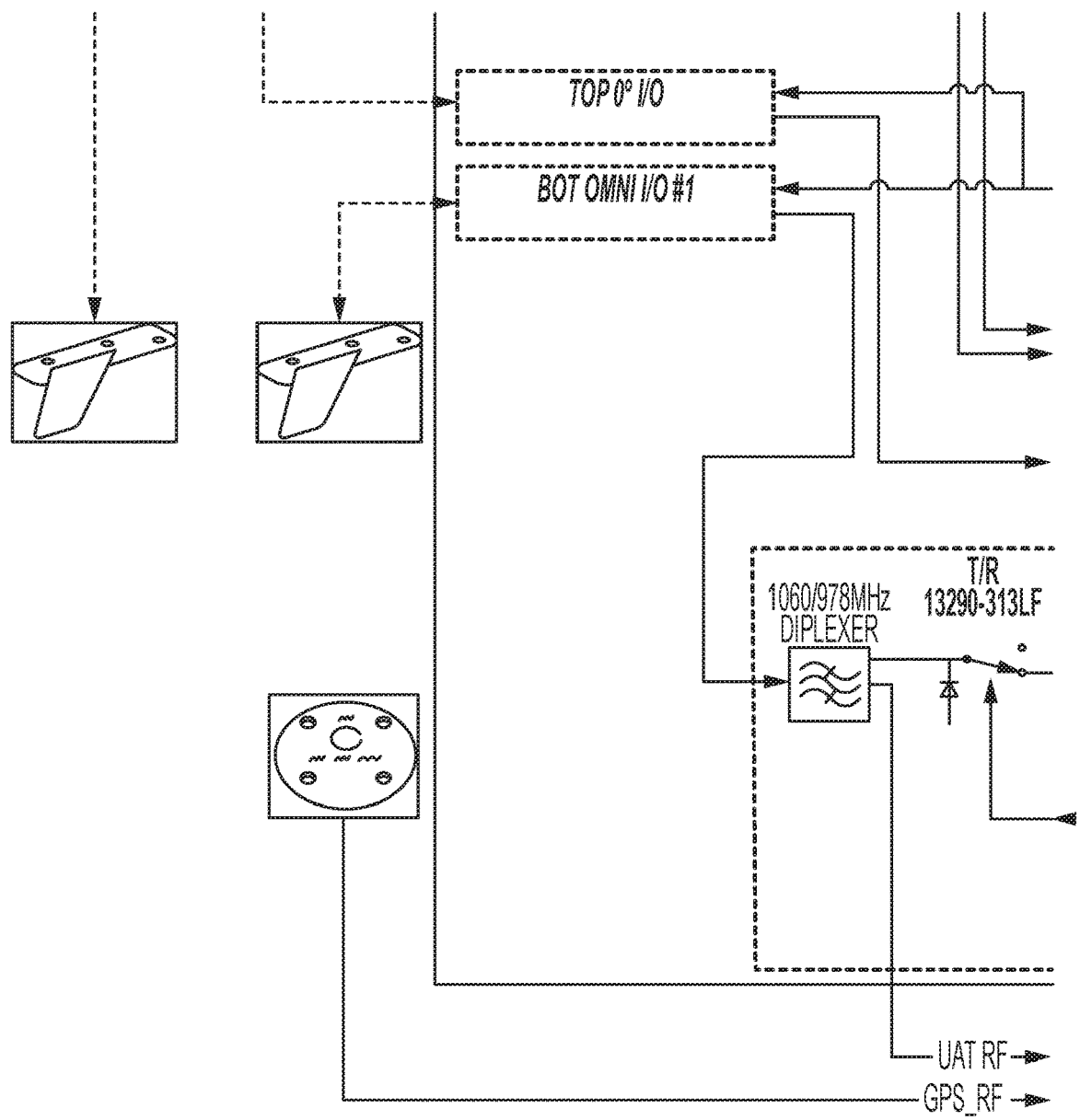
Figure 2:
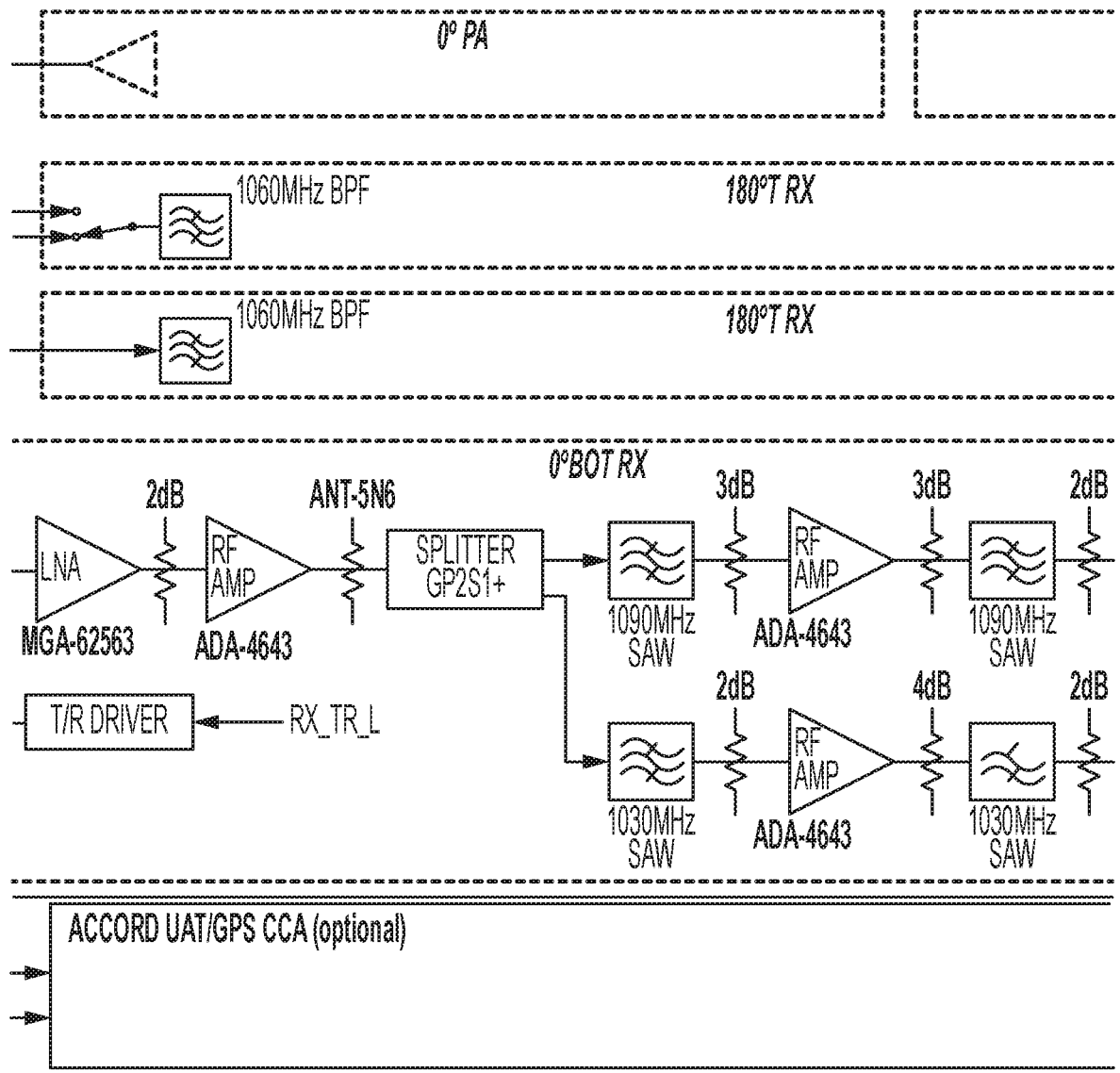
Figure 2:
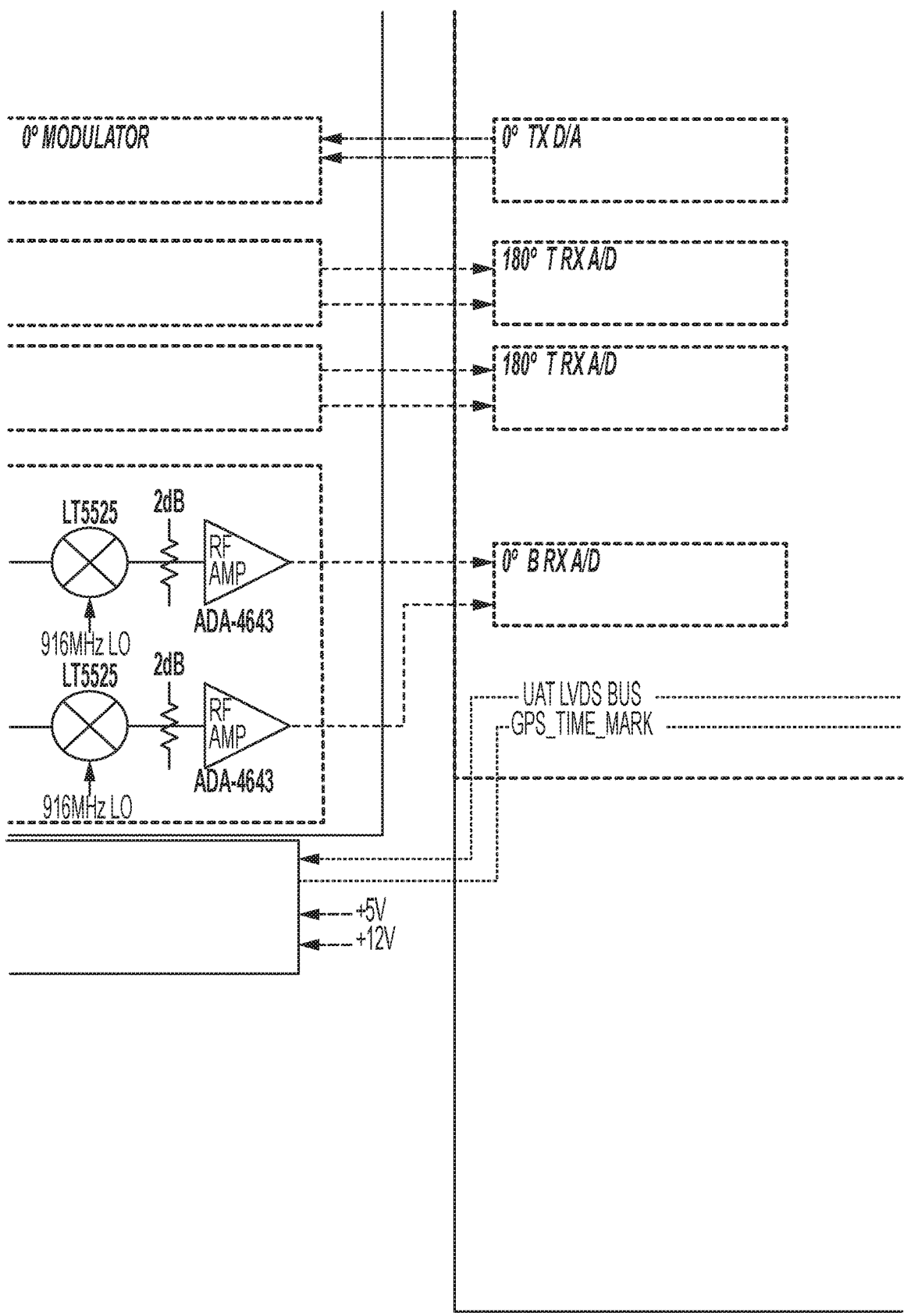
Figure 2:
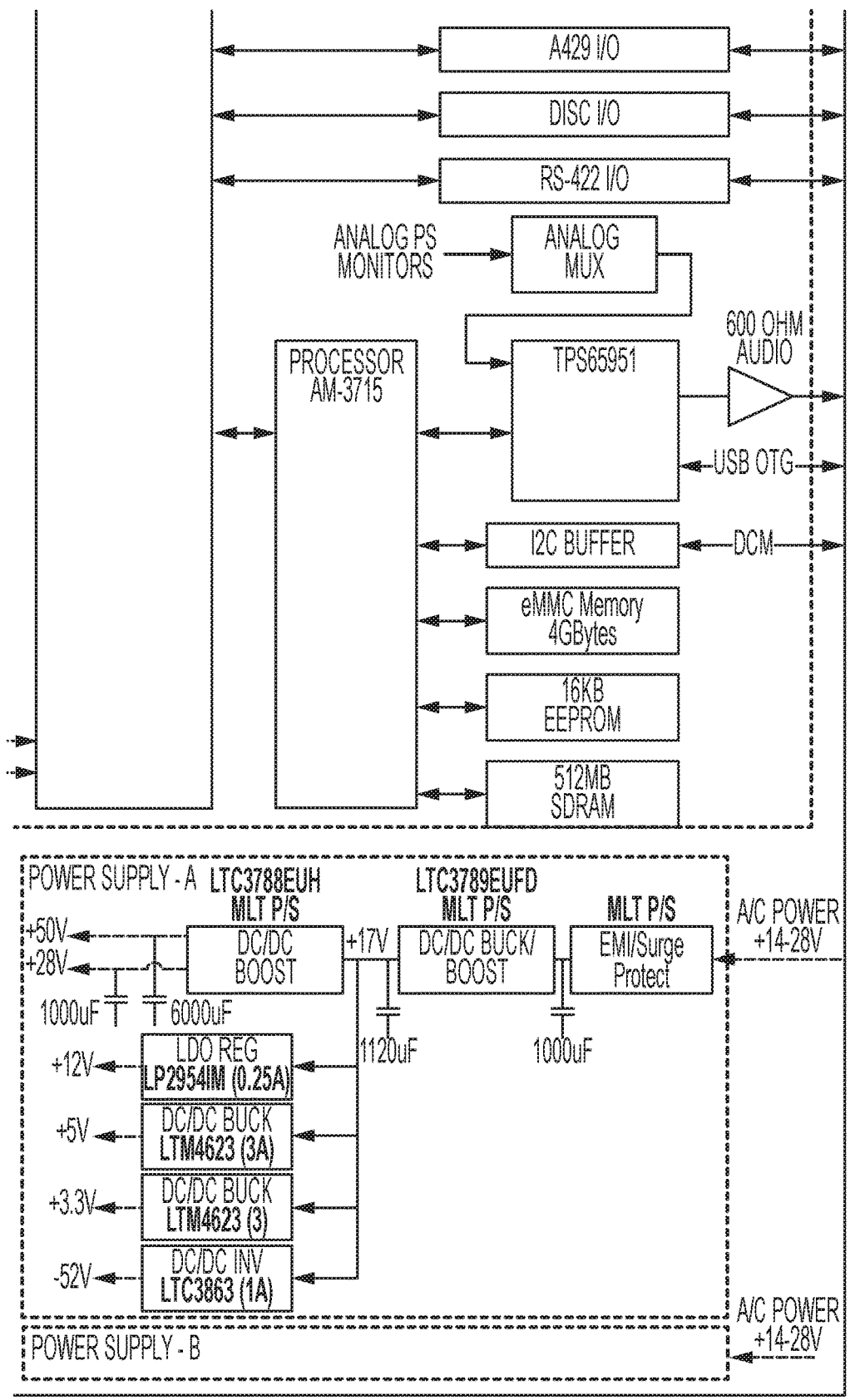

FIG. 2 illustrates integrated redundancy for the transponder function, according to certain embodiments of the present invention. The circuitry may be divided into two separate hardware partitions, A and B, as shown in FIG. 2. Each of the functions may have complete independence from the other. For example, each function may have an independent power supply, independent processors, independent I/O, independent transmitters and independent receivers. The number of transmitters and receivers may be equivalent to the number contained in FIG. 1; however, they may be partitioned between the side A and side B partition. Note that FIG. 2 shows the A and B partitions on the same circuit card; however, the partitions could be contained on separate circuit cards, or even in separate units.

When the unit has no failures, processor A can perform all radio frequency (RF) processing and I/O functions for TCAS and transponder functions. During this time, processor B may be in standby or could also perform part of the functionality for the transponder function. The RF transmitter and receiver processing functions may be performed by FPGA A and B for their respective transmitter or receiver hardware. The two FPGAs may coordinate with each other over a high speed bus or some other interface. For transmission and reception out of the top directional antenna, all four power amplifier (PA) channels may be required. For transmission and reception out of the bottom omni antenna, only the T0/B-OMNI PA channel may be used, while the BOT RX block may be used for receiver processing.

If a failure occurs or is detected in Partition A, the Partition B function may perform all functions required for the Mode-S transponder. The Partition B (XPDR) Processor and FPGA B may process all transponder system I/O and RF receiver and transmitter processing. The T90/T-OMNI PA transmitter may be connected to a top omnidirectional antenna through an external RF relay (or could be a dedicated antenna) through the TOP OMNI I/O #2 RF switch (PARTITION B). The T90/T-OMNI RX channel may be used for processing RF signals from the top omni antenna. The T0/B-OMNI PA transmitter may be connected to the bottom omni antenna, and the BOT RX may be used for the receiver signal processing.

If a failure occurs or is detected in Partition B, the Partition A function may perform all functions required for the Mode-S transponder. The Partition A processor(s) and FPGA A may process all transponder system I/O and RF receiver and transmitter processing. The T270/T-OMNI PA transmitter may be connected to a top omni-directional antenna through an external RF relay (or could be a dedicated antenna) through the TOP OMNI I/O #2 RF switch (PARTITION A). The T270/T-OMNI RX channel may be used for processing RF signals from the top omni antenna. The T180/B-OMNI PA transmitter may be connected to the bottom omni antenna through the BOT OMNI I/O #2 (PARTITION A) RF switch, and the T 180/B-OMNI RX may be used for the receiver signal processing.

Note that to meet the FAR requirements, a diversity transponder may not be required, so the back-up top omni-directional antenna could be eliminated, thereby simplifying the configuration.

There may be various embodiments of the present invention. For example, according to certain embodiments, a system can include a collision avoidance or alerting system function in wired connection to a directional antenna. The collision avoidance or alerting system function can include a TCAS-I, a TCAS-II, a traffic advisory system (TAS), an ADS-B advisory system, or an ACAS-X. Any other similar or equivalent systems can also be included within the general category of collision avoidance or alerting systems. In this context, a "function" can include computer hardware and communication hardware. The computer hardware may be any suitable processors, such as multiple core processors, a field programmable gate array (FPGA), or an application specific integrated circuit (ASIC). The communication hardware can include interface cards, power amplifiers, cabling, receivers, transmitters, and transceivers. The function can also include computer memory including a non-transitory computer-readable medium. The system can store a program of instructions on such memory, and can execute the program for example to accomplish the failover procedures described above.

The system can also include a first mode-S transponder function in wired connection to the directional antenna. The system can further include a second mode-S transponder function in wired connection to the directional antenna. The first mode-S transponder function is independent from the second mode-S transponder function.

Circuity of the first mode-S transponder function and circuit of the second mode-S transponder function can each be configured to support operation of the collision avoidance or alerting system function.

In a non-failed mode, the directional antenna can be used for the transponder function as well as TCAS. If circuitry for one transponder fails, the other independent transponder can use the omni-directional antenna instead of the directional. The circuitry for the two transponders, when both operational, can also enable the TCAS function to work.

The system can be a single unit, for example a single line replaceable unit (LRU). In certain embodiments, multiple interconnected LRUs can be used.

Being independent can include having an independent power supply, an independent processor, an independent input/output, an independent transmitter, an independent receiver, or any combination thereof. For example, in certain embodiments, all of those aspects of the functions are independent.

The first mode-S transponder is internally partitioned, within the system, in a first partition separate from the second mode-S transponder in a second partition. The first partition and the second partition can be on the same circuit card, on separate circuit cards in the same LRU, or even on separate LRUs.

The first mode-S transponder function and the second mode-S transponder function are configured to provide redundancy for each other, as described above. For example, a field programmable gate array of the first partition can be in communication with a field programmable gate array of the second partition over a high speed bus.

What is claimed is:

1. A communication system for an aircraft, the system comprising:
   a collision avoidance or alerting system function in wired connection to a directional antenna;
   a first mode-S transponder function in wired connection to the directional antenna; and
   a second mode-S transponder function in wired connection to the directional antenna, wherein the first mode-S transponder function is independent from the second mode-S transponder function.

2. The system of claim 1, wherein the system comprises a single unit.

3. The system of claim 1, wherein being independent comprises having an independent power supply, an independent processor, an independent input/output, an independent transmitter, an independent receiver, or any combination thereof.

4. The system of claim 1, wherein the first mode-S transponder is internally partitioned, within the system, in a first partition separate from the second mode-S transponder in a second partition.

5. The system of claim 4, wherein the first partition and the second partition are on a same circuit card.

6. The system of claim 4, wherein the first partition and the second partition are on separate circuit cards.

7. The system of claim 4, wherein the first partition and the second partition are on separate units.

8. The system of claim 1, wherein the first mode-S transponder function and the second mode-S transponder function are configured to provide redundancy for each other.

9. The system of claim 1, wherein a field programmable gate array of the first partition is in communication with a field programmable gate array of the second partition over a high speed bus.

10. The system of claim 1, wherein the collision avoidance or alerting system function comprises a TCAS-I, a TCAS-II, a traffic advisory system (TAS), an automatic dependent surveillance broadcast (ADS-B) advisory system, an ACAS-X, or any combination thereof.

11. The system of claim 1, wherein circuitry of the first mode-S transponder function and circuit of the second mode-S transponder function are each configured to support operation of the collision avoidance or alerting system function.

* * * * *